(12) United States Patent
Biasioli et al.

(10) Patent No.: US 12,137,724 B2
(45) Date of Patent: Nov. 12, 2024

(54) METHOD OF PRODUCING A LIQUID TOBACCO EXTRACT

(71) Applicant: Philip Morris Products S.A., Neuchatel (CH)

(72) Inventors: Matteo Biasioli, Neuchatel (CH); Marie Farine, Neuchatel (CH); Felix Frauendorfer, Neuchatel (CH); Jagoda Kuc, Neuchatel (CH); Sebastien Lanaspeze, Neuchatel (CH); Stefan Lauenstein, Neuchatel (CH); Benoit Mivelaz, Neuchatel (CH); Christel Raphoz, Neuchatel (CH); Patrick Charles Silvestrini, Neuchatel (CH); Steve Tzimoulis, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 7 days.

(21) Appl. No.: 17/615,973

(22) PCT Filed: Jun. 5, 2020

(86) PCT No.: PCT/EP2020/065704
§ 371 (c)(1),
(2) Date: Dec. 2, 2021

(87) PCT Pub. No.: WO2020/245410
PCT Pub. Date: Dec. 10, 2020

(65) Prior Publication Data
US 2022/0256909 A1 Aug. 18, 2022

(30) Foreign Application Priority Data

Jun. 5, 2019 (EP) .................................... 19178563

(51) Int. Cl.
| | | |
|---|---|---|
| A24D 1/22 | (2020.01) | |
| A24B 7/00 | (2006.01) | |
| A24B 15/167 | (2020.01) | |
| A24B 15/24 | (2006.01) | |
| A24B 15/26 | (2006.01) | |
| A24C 5/01 | (2020.01) | |
| A24D 1/02 | (2006.01) | |

(52) U.S. Cl.
CPC .............. *A24B 15/167* (2016.11); *A24B 7/00* (2013.01); *A24B 15/243* (2013.01); *A24B 15/26* (2013.01)

(58) Field of Classification Search
CPC ....... A24B 15/167; A24B 7/00; A24B 15/243; A24B 15/26
See application file for complete search history.

(56) References Cited

U.S. PATENT DOCUMENTS

| | | | |
|---|---|---|---|
| 3,174,485 A | 3/1965 | Griffith et al. | |
| 3,424,171 A | 1/1969 | Rooker | |
| 4,150,677 A | 4/1979 | Osborne, Jr. et al. | |
| 5,016,654 A | 5/1991 | Bernasek et al. | |
| 5,038,802 A | 8/1991 | White et al. | |
| 5,235,992 A | 8/1993 | Sensabaugh, Jr. | |
| 6,591,841 B1 | 7/2003 | White et al. | |
| 2007/0023058 A1 | 2/2007 | Howell et al. | |
| 2011/0174323 A1 | 7/2011 | Coleman, III et al. | |
| 2012/0060854 A1* | 3/2012 | Chen ................... | A24B 15/306 131/297 |
| 2012/0192880 A1 | 8/2012 | Dude et al. | |
| 2013/0160777 A1 | 6/2013 | Murphy | |
| 2016/0106144 A1* | 4/2016 | Muehlbauer ........... | A24B 15/26 131/352 |
| 2016/0360780 A1 | 12/2016 | Fujisawa et al. | |
| 2017/0231267 A1 | 8/2017 | Shi et al. | |
| 2017/0245543 A1 | 8/2017 | Karles et al. | |

FOREIGN PATENT DOCUMENTS

| | | |
|---|---|---|
| CA | 2 940 680 A1 | 9/2015 |
| CN | 101661022 A | 3/2010 |
| CN | 104783323 A | 7/2015 |
| CN | 104928026 A | 9/2015 |
| CN | 1051 42430 A | 12/2015 |
| CN | 105167170 A | 12/2015 |
| CN | 106028843 A | 10/2016 |

(Continued)

OTHER PUBLICATIONS

International Search Report and Written Opinion of the International Searching Authority issued Oct. 7, 2020 in PCT/EP2020/065704 (with English translation), 3 pages.
Extended European Search Report issued Nov. 27, 2019 in European Patent Application No. 19178563.3, 7 pages.
Fumin Peng, et al., "Comparison of Different Extraction Methods: Steam Distillation, Simultaneous Distillation and Extraction and Headspace Co-Distillation, used for the Analysis of the Volatile Components in Aged Flue-Cured Tobacco Leaves" Journal of Chromatography A, XP004508914, vol. 1040, No. 1, Jun. 18, 2004, pp. 1-17.
Combined Chinese Office Action and Search Report issued Sep. 15, 2022 in Patent Application No. 202080031412.5 (with English language translation), 19 pages. C (Continued)

*Primary Examiner* — Christopher M Rodd
*Assistant Examiner* — Jennifer A Kessie
(74) *Attorney, Agent, or Firm* — Oblon, McClelland, Maier & Neustadt, L.L.P.

(57) ABSTRACT

A method of producing a liquid tobacco extract is provided, the method including the steps of: preparing a tobacco starting material including natural tobacco material such that during the step of preparing the tobacco starting material, the tobacco is not subjected to any treatment adapted to alter the pH of the tobacco; heating the tobacco starting material in a flow of inert gas at an extraction temperature of between 125 degrees Celsius and 160 degrees Celsius for between 90 minutes and 270 minutes; collecting volatile compounds released from the natural tobacco starting material during the heating step; and forming a liquid tobacco extract comprising the collected volatile compounds.

12 Claims, No Drawings

(56) References Cited

FOREIGN PATENT DOCUMENTS

| | | | |
|---|---|---|---|
| CN | 106255424 A | 12/2016 |
| CN | 106867673 A | 6/2017 |
| CN | 107114821 A | 9/2017 |
| CN | 108347993 A | 7/2018 |
| CN | 108601390 A | 9/2018 |
| EP | 0 337 504 A2 | 10/1989 |
| EP | 0 821 886 A2 | 2/1998 |
| EP | 3199040 A1 | 8/2017 |
| GB | 1 203 940 A | 9/1970 |
| GB | 2031707 A | 4/1980 |
| JP | 10-66559 A | 3/1998 |
| RU | 2 228 121 C1 | 5/2004 |
| RU | 2 445 971 C2 | 6/2010 |
| RU | 2 519 905 C2 | 6/2014 |
| RU | 2 649 946 C2 | 9/2016 |
| WO | WO 2015/129679 A1 | 9/2015 |
| WO | WO 2016/051334 A1 | 4/2016 |
| WO | WO 2017/144705 A1 | 8/2017 |
| WO | WO 2018/197879 A1 | 11/2018 |
| WO | WO 2018/210680 A1 | 11/2018 |

OTHER PUBLICATIONS ombined Chinese Notice of Allowance and Search Report issued Jun. 8, 2023 in Chinese Patent Application No. 202080031412.5 (with English Translation), 7 pages.

Russian Office Action and Search Report mailed on Sep. 26, 2023, issued in Russian Patent Application No. 2021138916 filed on Jun. 5, 2020, with English Translation, total 15 pages.

Extended European Search Report mailed on Jan. 16, 2024 issued in European Patent Application No. 23204713.4 filed on Jun. 5, 2020, total 10 pages.

Japanese Office Action mailed on Jun. 25, 2024 issued in Japanese Patent Application No. 2021-568004, with English Translation, total 7 pages, citing documents 15-19, therein.

Palma, M. et al., "Chapter 2: Extraction of Natural Products: Principles and Fundamental Aspects, Natural Product Extraction: Principles and Applications", RSC Green Chemistry No. 21, 2013, pp. 58-88.

Matsukura, M. et al., "Comparison of Roasted Tobacco Volatiles with Tobacco Essential Oil and Cigarette Smoke Condensate", Agric. Biol. Chem., vol. 49, No. 3, 1985, pp. 711-718.

* cited by examiner

METHOD OF PRODUCING A LIQUID TOBACCO EXTRACT

The invention relates to a method of producing a liquid tobacco extract and to a liquid tobacco extract produced by such a method.

Aerosol-generating systems for delivering an aerosol to a user that comprise an atomiser configured to generate an inhalable aerosol from a liquid formulation, such as a liquid nicotine formulation, are known. Some known aerosol-generating systems comprise a thermal atomiser such as an electric heater that is configured to heat and vaporise the liquid formulation to generate an aerosol. One popular type of electrically heated aerosol-generating system is an e-cigarette. Other known aerosol-generating systems comprise a non-thermal atomiser that is configured to generate an aerosol from the liquid formulation using, for example, impinging jet, ultrasonic or vibrating mesh technologies.

Several methods for producing liquid tobacco extracts from tobacco material are known. Liquid tobacco extracts may be produced by a high temperature extraction process in which nicotine and other volatile flavour compounds are extracted from tobacco material and collected in a suitable solvent to form a natural liquid tobacco extract.

Maceration methods are also known, wherein a tobacco material is kept in suspension in an extraction liquid for a period of up to several weeks or even months. The resulting slurry is subsequently filtered, and the liquid phase thus collected can be used to manufacture a vaporisable liquid formulation. In one such method—so-called "cold maceration method"—there is generally no way of controlling the extraction conditions (e.g. temperature and pressure). In a variant of a maceration method, which has been described for example in US 2012/192880, the slurry is heated to 100 degrees Celsius or more.

The liquid phase collected upon filtration of the slurry, which represents the primary product of a maceration process, is highly diluted, and tends to have a low content of apolar tobacco flavour species. Additionally, the liquid phase typically contains little to no nicotine. As such, liquid extracts obtained by a maceration method generally need to be supplemented with additional ingredients, such as nicotine salts and glycerin, before being used in a vaporisable liquid formulation.

Alternative processes are known, wherein a tobacco material is substantially boiled in water for a period of hours or even days to form a vapour phase, and a distillate obtained by condensation of the vapour phase is continuously collected in a vessel. Over time, an oily, waxy layer containing a high proportion of apolar compounds builds up on the surface of the distillate.

On the one hand, the aqueous portion, above which the waxy layer builds up, and which contains nicotine and other water-soluble compounds, is recycled to the boiler. An apolar co-solvent may optionally be fed into the boiler with the aqueous portion in order to increase the extraction yield. On the other hand, the waxy phase is collected and ultimately forms the primary product of one such hydro-distillation process. Such product is often referred to as "tobacco essential oil", and contains a high proportion of apolar compounds found in tobacco, such as fatty acids, neophytadiene, etc. The tobacco essential oil obtained by one such method typically contains no nicotine.

It is also known to subject tobacco material to an extraction process involving use of a volatile apolar solvent. Examples of suitable solvents are cyclic or acyclic short alkanes, as well as chlorinated solvents like dichloromethane. In one such process, the excess solvent may be evaporated by controlled heating under vacuum. Typically, this is done in the presence of ethanol, which has a higher boiling point than the extraction solvent, such that even traces of the extraction solvent can be detected.

The primary product of one such solvent-aided extraction process is often referred to as "tobacco absolute", and may contain traces of ethanol. It is a waxy product and contains a highly concentrated mixture of most of the apolar compounds that can be extracted with the specific solvent, generally including nicotine, which is generally present at relatively high concentrations.

An alternative extraction process involves contacting a tobacco material with a solvent under supercritical conditions, such as supercritical carbon dioxide. One such process is disclosed in US 2013/160777, and relies on the principle that volatile substances within a feed material contacted with a supercritical fluid may partition into the supercritical phase. After dissolution of any soluble material, the supercritical fluid containing the dissolved substances can be removed, and the dissolved components of the feed matter can be separated out from the supercritical fluid. The primary product of a supercritical extraction process is substantially similar to the "tobacco absolute" of a solvent-aided extraction process run at lower temperature and pressure, contains no residual solvent and typically has a high level of the waxy, apolar compounds and includes nicotine, which is generally present at relatively high concentrations.

However, all the tobacco extracts obtainable by methods known in the art tend to have a very low level—if any—of compounds associated with the flavour of heated tobacco, such as furaneol.

In general, as discussed above, liquid tobacco extracts obtained by such known extraction processes may have a low level of nicotine. Further, liquid tobacco extracts obtained by such extraction processes may have a low level and low variety of flavour species. Liquid tobacco extracts obtained by such extraction processes may also have a high level of undesirable compounds. In general, the concentration of nicotine, flavour species and undesirable compounds obtained by such extraction processes may be significantly impacted by the type or types of tobacco used as a starting material.

A purpose of the invention is to alleviate one or more of the drawbacks of the liquid tobacco extracts obtained by known processes. It would be particularly desirable to produce one such novel and improved liquid tobacco extract using existing apparatus and techniques without the need for significant modification.

The present disclosure relates to a method for producing a liquid tobacco extract from a tobacco starting material. The method may include the step of preparing a tobacco starting material. The tobacco starting material may be heated at an extraction temperature of between about 100 degree Celsius and about 160 degrees Celsius. The heating may be carried out for at least 90 minutes. The method may further comprise the step of collecting the volatile compounds released from the tobacco starting material during the heating step. The method may further comprise the step of forming a liquid tobacco extract comprising the collected volatile compounds.

According to the present invention there is provided a method of producing a liquid tobacco extract, the method comprising the steps of: preparing a tobacco starting material; heating the tobacco starting material at an extraction temperature of between about 100 degrees Celsius and about 160 degrees Celsius for at least about 90 minutes; collecting the volatile compounds released from the tobacco starting material during the heating step; and forming a liquid tobacco extract comprising the collected volatile compounds.

According to the present invention there is further provided a liquid tobacco extract produced by the method of the present invention, as defined above.

As used herein with reference to the invention, the term "liquid tobacco extract" describes the direct product of an extraction process carried out on a tobacco starting material. Thus, the tobacco extract typically includes a mixture of natural components separated from, removed from, or derived from, a natural tobacco material using tobacco extraction processing conditions and techniques. Thus, in one such process extracted tobacco components are removed from the natural tobacco material and separated from unextracted tobacco components. According to the present invention, the extraction process for producing the liquid tobacco extract comprises heating the tobacco starting material under specific heating conditions and collecting the volatile compounds generated. The liquid tobacco extract therefore consists of the mixture of natural tobacco components that have derived from the tobacco starting material and have been extracted or formed during the extraction process, typically in combination with one or more materials other than the tobacco starting material, such as a non-aqueous extraction solvent used during the extraction process. As will be described in more detail below, the volatile compounds released from the starting tobacco material may be collected using an absorption technique in which the volatile compounds are trapped in a non-aqueous extraction solvent. By way of example, an inert gas flow containing the volatile compounds may be directed into a container of a non-aqueous extraction solvent. The non-aqueous extraction solvent is preferably an aerosol former.

The extraction method of the present invention uses an extraction temperature within a specific range in combination with a specifically defined heating duration that advantageously provides an improved liquid tobacco extract having a significantly improved balance of desirable compounds to undesirable compounds. In particular, the extraction method of the present invention provides a liquid tobacco extract having a maximised ratio of desirable compounds to undesirable compounds for the tobacco starting material. For example, the use of the specific combination of extraction temperature and time as defined enables the levels of nicotine compounds to be optimised whilst also minimising the levels of undesirable compounds such as furans, carbonyls, phenols and TSNAs.

The inventors of the present invention have found that, in contrast to the existing extraction processes that have been discussed above, methods in accordance with the present invention advantageously provide a liquid tobacco extract that has a significantly higher content of compounds associated with the flavour of heated tobacco, such as for example furaneol. These compounds are substantially absent, or are present in trace amounts, in a tobacco extract obtained by a maceration process, which also typically contains little to no nicotine. These compounds are also generally absent or present in trace amounts in a tobacco extract obtained using a solvent, including under supercritical conditions. Similarly, a tobacco essential oil obtained by way of a distillation process also typically has a very low content—if any—of such compounds associated with the flavour of heated tobacco.

The liquid tobacco extracts obtained by methods in accordance with the invention present significant compositional differences with respect to tobacco extracts obtained by the existing extraction processes, and can be used as an e-liquid or for the preparation of an e-liquid that, when heated, generates an aerosol having a distinct composition and flavour characteristics compared with currently available e-liquids. In particular, liquid tobacco extracts obtained by a method in accordance with the invention may be used to generate an aerosol that provides a heated tobacco taste which more closely resembles an aerosol generated by conventional cigarettes or upon heating tobacco in a heat-not-burn device relative to available aerosols produced from existing liquid nicotine compositions.

The extraction method of the present invention enables a liquid tobacco extract to be produced which has the desired levels of nicotine and flavour compounds without the need for addition of such compounds after extraction. The resultant liquid tobacco extract can therefore advantageously be used directly to provide a nicotine composition. The resultant liquid tobacco extract can also be modified by one or more further processing steps or mixed with one or more further ingredients to form a nicotine composition. The nicotine composition can be for use in an e-cigarette or other aerosol-generating system.

Aerosol-generating systems for delivering an aerosol to a user that comprise an atomiser configured to generate an inhalable aerosol from a liquid formulation, such as a liquid nicotine composition, are known, as described above.

The method of producing a liquid tobacco extract of the present invention can be used effectively for all types and grades of tobacco, including Burley tobacco, flue-cured tobacco and Oriental tobacco. The method steps can be readily adjusted in order to provide a consistent liquid tobacco extract for a variety of blends of tobacco type. The extraction method is additionally suitable for a variety of forms of tobacco starting material.

In many cases, the tobacco starting material can be heated without the need for significant pre-treatment steps. The method can therefore be carried out efficiently.

The method can advantageously be carried out using existing apparatus and techniques, which can be readily modified in order to carry out the method steps of the present invention.

As defined above, in the method of producing a liquid tobacco extract, a tobacco starting material is heated under specific heating conditions to release the volatile tobacco components, which are collected and formed into a liquid tobacco extract.

During the heating step, the tobacco starting material is heated to an extraction temperature of between about 100 degrees Celsius and about 160 degrees Celsius. It has been found that below this range, insufficient levels of nicotine and certain flavour compounds are released from the tobacco starting material such that the resultant liquid tobacco extract lacks the desired flavour characteristics. On the other hand, if the tobacco starting material is heated to a temperature above this defined range, unacceptably high levels of certain undesirable tobacco compounds may be released.

Preferably, the extraction temperature is at least about 110 degrees Celsius, more preferably at least about 115 degrees Celsius, more preferably at least about 120 degrees Celsius, more preferably at least about 125 degrees Celsius.

Preferably, the extraction temperature is no more than about 150 degrees Celsius, more preferably no more than about 145 degrees Celsius, more preferably no more than about 140 degrees Celsius, most preferably no more than about 135 degrees Celsius.

For example, the extraction temperature may be between about 110 degrees Celsius and 150 degrees Celsius, or between about 120 degrees Celsius and about 140 degrees Celsius, or between about 125 degrees Celsius and about 135 degrees Celsius, or about 130 degrees Celsius. An extraction temperature of around 130 degrees Celsius has been found to provide a particularly optimised ratio of desirable to undesirable compounds in the liquid tobacco extract.

The extraction temperature may be between about 110 degrees Celsius and about 130 degrees Celsius, or between about 115 degrees Celsius and about 125 degrees Celsius, or about 120 degrees Celsius.

The extraction temperature may be between about 125 degrees Celsius and about 155 degrees, more preferably between about 135 degrees Celsius and about 145 degrees Celsius, or about 140 degrees Celsius.

The tobacco starting material is heated at the extraction temperature for at least about 30 minutes or for at least 60 minutes or for at least about 90 minutes, more preferably for at least about 120 minutes. This extraction time is sufficiently long that the desired tobacco flavour compounds can be extracted efficiently to provide a liquid tobacco extract that can produce an aerosol having the desired flavour characteristics.

Preferably, the tobacco starting material is heated at the extraction temperature for no more than about 270 minutes, more preferably no more than about 180 minutes.

For example, the tobacco starting material may be heated for between about 90 minutes and about 270 minutes, or between about 120 minutes and about 180 minutes.

The heating time indicated above corresponds to the duration of time over which the tobacco starting material is heated at the extraction temperature and does not include the time taken to increase the temperature of the tobacco starting material up to the extraction temperature.

The extraction temperature and the duration of heating may be selected within the ranges defined above depending upon factors such as the type of tobacco, possible other components of the tobacco starting material, the desired level of nicotine or the desired composition of the liquid tobacco extract. By controlling the combination of extraction temperature and time, the composition of the liquid tobacco extract can be adjusted depending on the desired characteristics of the aerosol generated from the liquid tobacco extract. In particular, the proportion of specific tobacco compounds within the liquid tobacco extract can be adjusted to a certain degree through the selection of the extraction parameters in order to maximise the ratio of desirable to undesirable tobacco compounds within the liquid tobacco extract.

For a specific tobacco compound, the variation in the level of release of the compound with extraction temperature during the extraction process can be readily determined for any given tobacco starting material. For example, it has been found that the level of nicotine released from a tobacco starting material will typically increase with increasing extraction temperature. The rate of increase has been found to vary for different tobacco types.

It has also been found that the level of desirable tobacco flavour compounds, such as β-damascenone and β-ionone, released from a tobacco material will increase with increasing extraction temperature up to a certain peak extraction temperature, after which the level will begin to decrease.

The peak extraction temperature for such flavour compounds is typically within the range of 100 degrees Celsius to 160 degrees Celsius such that the level of desirable flavour compounds can be effectively optimised in the extraction method of the present invention.

Many undesirable tobacco compounds have been found to increase slowly with increasing extraction temperature up to a threshold temperature, beyond which a rapid increase is observed. This applies, for example, to the level of phenolic compounds, TSNAs and pyrazines and in the case of Bright tobaccos, to the level of furans and formaldehyde. In many cases, the threshold temperature is within the range of 100 degrees Celsius to 160 degrees Celsius and therefore the level of the undesirable compounds can be effectively controlled in the extraction method of the present invention.

Preferably, the extraction temperature and extraction time are selected to provide a nicotine content in the liquid tobacco extract of at least 0.1 percent by weight, more preferably at least about 0.2 percent by weight.

Preferably, the extraction temperature or the extraction time or both the extraction temperature and the extraction time are selected to provide a ratio by weight of (β-ionone+β-damascenone) to (phenol) of at least about 0.25 in the liquid tobacco extract. More preferably, the extraction temperature or the extraction time or both the extraction temperature and the extraction time are selected to provide a ratio by weight of (β-ionone+β-damascenone) to (phenol) of at least about 0.5, even more preferably at least about 1, most preferably at least about 1.5 in the liquid tobacco extract. In particularly preferred embodiments, the extraction temperature or the extraction time or both the extraction temperature and the extraction time are selected to provide a ratio by weight of (β-ionone+β-damascenone) to (phenol) of at least about 2 and most preferably such that ratio by weight of (β-ionone+β-damascenone) to (phenol) is from about 2 to about 10 or from about 2 to about 5 in the liquid tobacco extract.

β-damascenone and β-ionone are desirable compounds associated with tobacco flavour. It has been found that the amount of β-damascenone and β-ionone released from a tobacco material will increase with increasing the extraction temperature up to a certain peak extraction temperature, after which the level will begin to decrease. The peak extraction temperature for such flavour compounds is typically within the range of 100 degrees Celsius to 160 degrees Celsius such that the level of desirable flavour compounds can be effectively tailored and controlled in the extraction method.

Preferably, the extraction temperature or the extraction time or both the extraction temperature and the extraction time are selected to provide a ratio by weight of (furaneol+ (2,3-diethyl-5-methylpyrazine)*100)) to (nicotine) of at least about $5 \times 10^{-4}$ in the liquid tobacco extract. More preferably, the extraction temperature or the extraction time or both the extraction temperature and the extraction time are selected to provide a ratio by weight of (furaneol+(2,3-diethyl-5-methylpyrazine)*100)) to (nicotine) of at least about $8 \times 10^{-4}$, even more preferably at least about $1 \times 10^{-3}$ in the liquid tobacco extract. The extraction temperature or the extraction time or both the extraction temperature and the extraction time are preferably selected to provide a ratio by weight of (furaneol+(2,3-diethyl-5-methylpyrazine)*100)) to (nicotine) of less than or equal to about $9 \times 10^{-3}$, more preferably less than or equal to about $5 \times 10^{-3}$ in the liquid tobacco extract. In some preferred embodiments, the extraction temperature or the extraction time or both the extraction temperature and the extraction time are selected to provide a ratio by weight of (furaneol+(2,3-diethyl-5-methylpyrazine)*100)) to (nicotine) of from about $8\times10^{-4}$ to about $9\times10^{-3}$ or from about $8\times10^{-4}$ to about $5\times10^{-3}$ or from about $1\times10^{-3}$ to about $9\times10^{-3}$ or from about $1\times10^{-3}$ to about $5\times10^{-3}$ in the liquid tobacco extract.

It has been found that in methods in accordance with the present invention wherein the extraction temperature is selected to provide ratios within the ranges described above, particularly good sensory profiles may be attained when nicotine compositions prepared from liquid tobacco extracts are heated to generate an aerosol.

The heating step is preferably carried out in an inert atmosphere. Preferably, a flow of an inert gas, such as nitrogen, is passed through the starting tobacco material during the heating step. In some cases, a flow of a combination of an inert gas with water or steam may be used. The addition of water or steam to the tobacco during extraction has been found to increase yield of extracted components. However, excess addition of water or steam leads to processing difficulties such as stickiness of the tobacco material.

The volatile tobacco compounds are released into the flow of inert gas during the heating step such that the inert gas (or combination of inert gas with water or steam) acts as a carrier for the volatile components. The inert gas flow rate may be optimised based on the scale and geometry of the extraction chamber. A relatively high flow rate of inert gas may advantageously improve the efficiency of extraction from the tobacco starting material.

In general, upon heating the tobacco starting material, any moisture present in the tobacco starting material is also released with the volatile compounds, in the form of steam.

The flow of inert gas helps convey the steam generated by evaporation of the moisture content of the tobacco starting material and the volatile compounds—including, in particular, nicotine or flavour-associated compounds or both—out of the extraction equipment.

Further, use of a flow of inert gas, such as nitrogen, under light over-pressure in the extraction equipment has the benefit of preventing the presence of oxygen within the extraction equipment. This is desirable in that it prevents risk of any, even partial, combustion of the tobacco starting material during the heating step. Uncontrolled combustion of the tobacco starting material would clearly be undesirable as it would represent a major safety risk within the manufacturing environment. However, the inventors have found that even a limited, partial combustion of the tobacco starting material may lead to a decrease in the quality of the tobacco extract obtainable by the method, which would be undesirable.

Without wishing to be bound by theory, it is understood that, by preventing combustion of the tobacco starting material, the formation of any undesirable combustion by-products is also prevented. Further, as conditions that would be conducive to combustion of the tobacco starting material are prevented, the tobacco starting material is effectively heated under conditions that mimic, to an extent, conditions under which a tobacco-containing substrate (e.g. homogenised tobacco material) is typically heated in "heat-not-burn" articles. As a result, selective extraction of the flavour-bearing volatile species responsible for the taste consumers associate with heated tobacco is advantageously favoured.

Therefore, by carrying out the heating step in an inert atmosphere, the extraction efficiency, product quality and manufacturing safety are advantageously enhanced.

The heating of the tobacco starting material in a flow of inert gas has the additional benefit that the inert gas flow containing the volatile compounds may be more easily directed into a container containing an extraction solvent, such as a non-aqueous extraction liquid solvent.

Optionally, the heating step may be carried out under vacuum. This removes any oxygen present within the extraction chamber, which may advantageously prevent reaction of the tobacco starting material or volatile compounds generated upon heating of the tobacco starting material with oxygen. The removal of oxygen will also prevent any combustion of the tobacco starting material, as described above.

Suitable heating methods for carrying out the heating of the tobacco starting material would be known to the skilled person and include but are not limited to: dry distillation, hydrodistillation, vacuum distillation, flash distillation and thin film hydrodistillation.

The liquid tobacco extract may be produced from a tobacco starting material consisting of a single type of natural tobacco. Alternatively, the tobacco starting material may comprise a blend of two or more types of natural tobaccos. The ratio of the different tobacco types may be adapted depending on the desired characteristics of the aerosol generated from the liquid tobacco extract. For example, where it is desired to provide a relatively high level of nicotine, the proportion of Burley tobacco may be increased.

The term "natural tobacco" is used herein with reference to the present invention to describe any part of any plant member of the genus *Nicotiana*, including, but not limited to, leaves, midribs, stems and stalks. In particular, the natural tobacco may comprise flue-cured tobacco material, Burley tobacco material, Oriental tobacco material, Maryland tobacco material, dark tobacco material, dark-fired tobacco material, *Rustica* tobacco material, as well as material from other rare or specialty tobaccos, or blends thereof. As will be described in more detail below, the tobacco material may be whole (for example, whole tobacco leaves), shredded, cut or ground.

Where it is desired to produce a liquid tobacco extract from a combination of two of more different tobacco types, the tobacco types may be heated separately at different extraction temperatures within the defined range of 100 degrees Celsius to 160 degrees Celsius, or a mixture of the tobacco types may be heated together at a single extraction temperature within the range.

The tobacco starting material may be a solid tobacco material, such as a powder, leaf scraps or shreds, or intact leaf. Alternatively, the tobacco starting material may be a liquid tobacco material such as a dough, gel, slurry, or suspension.

The tobacco starting material may be derived from any suitable tobacco material, including but not limited to tobacco leaf, tobacco stem, reconstituted tobacco, cast tobacco, extruded tobacco or tobacco derived pellets.

Preferably, in the step of preparing the tobacco starting material, the tobacco is ground or cut in order to reduce the size of tobacco particles within the tobacco starting material. This may advantageously improve the homogeneity of heating of the tobacco starting material and the efficiency of the extraction.

The tobacco starting material may optionally be dried prior to the heating step in order to decrease the water content of the tobacco starting material. Drying of the tobacco starting material may be carried out by any suitable chemical or physical drying process. Alternatively, water may be added to the tobacco starting material prior to the heating step in order to increase the water content of the tobacco starting material.

In certain embodiments of the present invention, the step of preparing the tobacco starting material may comprise the step of impregnating the tobacco starting material with an aerosol former. When this impregnation of the tobacco starting material is carried out prior to the heating step, it may advantageously increase the amount of certain desirable tobacco compounds that are released from the tobacco starting material upon heating. For example, impregnation of the tobacco starting material with glycerin has been found to advantageously increase the amount of nicotine that is extracted from the tobacco starting material. In another example, impregnation of the tobacco starting material with a non-aqueous extraction solvent that is also an aerosol former, such as propylene glycol, vegetal glycerin, 1,3-propanediol, triacetin, or mixtures thereof has been found to advantageously increase the amount of flavour compounds that are extracted from the tobacco starting material.

In preferred embodiments, the tobacco starting material consists of natural tobacco. As such, a water content in the tobacco starting material may be about 11 percent by weight (water content typically found in natural tobacco material).

In other embodiments, the tobacco starting material may comprise one or more additional ingredients, such as for example a non-aqueous solvent or added water or both. An example of a suitable solvent is propylene glycol.

The tobacco starting material may thus comprise at least about 40 percent by weight of natural tobacco material or at least about 60 percent by weight of natural tobacco material or at least about 80 percent by weight of natural tobacco material or at least about 90 percent by weight of natural tobacco material or at least about 95 percent by weight of natural tobacco material.

The water content in the tobacco starting material may be at least about 3 percent by weight. Preferably, the water content in the tobacco starting material is at least about 5 percent by weight. More preferably, the water content in the tobacco starting material is at least about 5 percent by weight. It will be appreciated that "the water content in the tobacco starting material" may include both water inherently present in the natural tobacco material as well as any added water.

The water content in the tobacco starting material may be less than or equal to about 60 percent by weight. Preferably, the water content in the tobacco starting material is less than or equal to about 20 percent by weight. More preferably, the water content in the tobacco starting material is less than or equal to about 12 percent by weight.

In some embodiments, the water content in the tobacco starting material may be from about 3 percent by weight to about 60 percent by weight, more preferably from about 3 percent by weight to about 20 percent by weight, even more preferably from about 3 percent by weight to about 12 percent by weight. In other embodiments, the water content in the tobacco starting material may be from about 5 percent by weight to about 60 percent by weight, more preferably from about 5 percent by weight to about 20 percent by weight, even more preferably from about 5 percent by weight to about 12 percent by weight. In further embodiments, the water content in the tobacco starting material may be from about 8 percent by weight to about 60 percent by weight, more preferably from about 8 percent by weight to about 20 percent by weight, even more preferably from about 8 percent by weight to about 12 percent by weight.

In some embodiment, the non-aqueous solvent content may be at least about 5 percent by weight or at least about 10 percent by weight or at least about 15 percent by weight or at least about 20 percent by weight or at least about 25 percent by weight or at least about 30 percent by weight or at least about 35 percent by weight or at least about 40 percent by weight.

Optionally, the tobacco starting material may be digested enzymatically prior to the heating step. This has been found to provide a significant increase in the yield of certain flavour compounds from the tobacco starting material.

Preferably, in the step of preparing the tobacco starting material, the tobacco is not subjected to any treatment adapted to alter the pH of the tobacco. In particular, in the step of preparing the tobacco starting material, the tobacco is not subjected to any treatment adapted to significantly increase the pH of the tobacco. For example, the tobacco starting material are not contacted with an aqueous solution containing a salt of an alkali or alkali-earth metal. Advantageously it has been found that maintaining the tobacco material in a less modified state may provide a more authentic or more natural flavour profile which may be appreciated by a consumer. Furthermore, it has been shown that the absence of any treatment adapted to alter the pH of the tobacco starting material provides a liquid tobacco extract with a particularly optimised ratio of desirable compounds to undesirable compounds.

The tobacco starting material may optionally be analysed prior to the heating step in order to determine the composition, for example, the content of reducing sugars of alkaloids. This information about the composition may helpfully be used to select an appropriate extraction temperature.

During the heating of the tobacco starting material, the volatile compounds are released in gaseous form from the tobacco starting material. The volatile compounds are collected using any suitable technique. Where the tobacco starting material is heated in a flow of an inert gas, as described above, the volatile compounds are collected from the inert gas flow. Different collection methods would be well known to the skilled person.

In certain preferred embodiments, the step of collecting the volatile compounds uses an absorption technique in which the volatile compounds are trapped in a non-aqueous extraction liquid solvent. For example, an inert gas flow containing the volatile compounds may be directed into a container of a non-aqueous extraction liquid solvent. The non-aqueous extraction liquid solvent is preferably an aerosol former such as triacetin, glycerin, 1,3-propanediol, propylene glycol or combinations thereof. The use of an aerosol former as the liquid solvent is potentially beneficial because the aerosol former can be retained as a diluting agent in the final liquid tobacco extract. This means that an additional step of removing the non-aqueous extraction solvent is not necessarily required.

As used herein with reference to the present invention, the term "aerosol former" refers to a compound or mixture of compounds that, in use, facilitates formation of an aerosol, and that preferably is substantially resistant to thermal degradation at the operating temperature of the aerosol-generating article or device. Examples of suitable aerosol-formers include: polyhydric alcohols, such as propylene glycol, triethylene glycol, 1,3-propanediol, and glycerin; esters of polyhydric alcohols, such as glycerol mono-, di- or triacetate; and aliphatic esters of mono-, di- or polycarboxylic acids, such as dimethyl dodecanedioate and dimethyl tetradecanedioate.

Preferably, the non-aqueous liquid solvent is retained at a temperature of less than 0 degrees Celsius in order to optimise the transfer of the volatile compounds into the liquid solvent. The non-aqueous extraction solvent is preferably retained at a temperature of no less than −10 degrees Celsius. Temperatures below such value may lead to undesirable freezing phenomena.

In alternative preferred embodiments, the step of collecting the volatile compounds may be carried out using a condensation technique in which the volatile compounds are condensed and the condensate is collected. Condensation of the volatile compounds may be carried out using any suitable apparatus, for example, in a refrigerated column. Preferably, the condensate obtained is added to a liquid aerosol former, preferably propylene glycol.

The addition of a liquid aerosol former in the collection step, and particularly addition of propylene glycol, may advantageously prevent the condensed volatile compounds from splitting into two phases or forming an emulsion, as some tobacco constituents would tend to do. Without wishing to be bound by theory, the inventors have observed that the solubility of the tobacco constituents in the hydrolate (i.e. the aqueous fraction of the liquid, naturally derived tobacco extract) depends primarily on their polarity, on their concentration and on the pH of the hydrolate, which may vary depending on the tobacco type. As a result, an oily layer tends to form at the surface of the liquid, naturally derived tobacco extract, if the amount of aerosol former is not sufficient. Such oily material can aggregate at different locations on the trapping and desiccation equipment wherein the third and further steps of the method are carried out, respectively. The addition of a liquid aerosol former, such as propylene glycol, helps prevent the formation of such layer and favours homogenisation of the liquid, naturally derived tobacco extract. This, in turn, helps prevent any loss of desirable flavour-associated compounds during the fourth (desiccation) step, during which such compounds may undesirably deposit on the equipment surfaces.

In addition, the liquid aerosol former advantageously helps trap the flavour-associated compounds independent of their polarity and volatility. Further, during any subsequent drying step, the liquid aerosol former helps prevent loss of the most volatile fraction, as well as favour the selective removal of excess water from the liquid, naturally derived tobacco extract to obtain the concentrated tobacco extract.

Use of propylene glycol as the aerosol former for the collection step has the further advantage that, by reducing the water activity of aqueous solutions, propylene glycol exerts an anti-microbial activity. By adjusting the content of propylene glycol in the liquid tobacco extract, it is therefore also possible to ensure that the extract substantially does not undergo any microbial activity.

As a further alternative, the step of collecting the volatile compounds may be carried out using an adsorption technique in which the volatile compounds are adsorbed onto the surface of a solid adsorbent material, such as activated carbon. The adsorbed compounds are then transferred into a liquid solvent.

In the method of the present invention, the next step is the formation of a liquid tobacco extract from the collected volatile compounds. The nature of this step may depend upon the collection method. The "collected volatile compounds" will typically comprise a solution of the tobacco derived volatile compounds in a liquid solvent or carrier.

Where the volatile compounds are collected by absorption in a non-aqueous extraction solvent, as described above, the extraction method provides a liquid tobacco extract that may comprise greater than about 25 percent by weight of the non-aqueous extraction solvent based on the weight of the liquid tobacco extract. In some embodiments, the liquid tobacco extract may comprise greater than about 30 percent by weight of the non-aqueous extraction solvent based on the weight of the liquid tobacco extract or greater than about 35 percent by weight of non-aqueous extraction solvent based on the weight of the liquid tobacco extract.

The liquid tobacco extract may comprise less than or equal to about 65 percent of non-aqueous extraction solvent based on the weight of the liquid tobacco extract. In some embodiments, the liquid tobacco extract may comprise less than or equal to 60 percent of non-aqueous extraction solvent based on the weight of the liquid tobacco extract or less than or equal to 55 percent of non-aqueous extraction solvent based on the weight of the liquid tobacco extract.

In some embodiments, the liquid tobacco extract may comprise from about 25 percent by weight of the non-aqueous extraction solvent based on the weight of the liquid tobacco extract to about 65 percent by weight of the non-aqueous extraction solvent based on the weight of the liquid tobacco extract. The liquid tobacco extract may comprise from about 25 percent by weight of the non-aqueous extraction solvent based on the weight of the liquid tobacco extract to about 60 percent by weight of the non-aqueous extraction solvent based on the weight of the liquid tobacco extract. The liquid tobacco extract may comprise from about 25 percent by weight of the non-aqueous extraction solvent based on the weight of the liquid tobacco extract to about 55 percent by weight of the non-aqueous extraction solvent based on the weight of the liquid tobacco extract.

In other embodiments, the liquid tobacco extract may comprise from about 30 percent by weight of the non-aqueous extraction solvent based on the weight of the liquid tobacco extract to about 65 percent by weight of the non-aqueous extraction solvent based on the weight of the liquid tobacco extract. The liquid tobacco extract may comprise from about 30 percent by weight of the non-aqueous extraction solvent based on the weight of the liquid tobacco extract to about 60 percent by weight of the non-aqueous extraction solvent based on the weight of the liquid tobacco extract. The liquid tobacco extract may comprise from about 30 percent by weight of the non-aqueous extraction solvent based on the weight of the liquid tobacco extract to about 55 percent by weight of the non-aqueous extraction solvent based on the weight of the liquid tobacco extract.

In further embodiments, the liquid tobacco extract may comprise from about 35 percent by weight of the non-aqueous extraction solvent based on the weight of the liquid tobacco extract to about 65 percent by weight of the non-aqueous extraction solvent based on the weight of the liquid tobacco extract. The liquid tobacco extract may comprise from about 35 percent by weight of the non-aqueous extraction solvent based on the weight of the liquid tobacco extract to about 60 percent by weight of the non-aqueous extraction solvent based on the weight of the liquid tobacco extract. The liquid tobacco extract may comprise from about 35 percent by weight of the non-aqueous extraction solvent based on the weight of the liquid tobacco extract to about 55 percent by weight of the non-aqueous extraction solvent based on the weight of the liquid tobacco extract. The non-aqueous extraction solvent is preferably triacetin, glycerin, propylene glycol, 1,3-propanediol or a mixture thereof.

In preferred embodiments, in the liquid tobacco extract a ratio by weight of (β-ionone+β-damascenone) to (phenol) is at least about 0.25. More preferably, a ratio by weight of (β-ionone+β-damascenone) to (phenol) in the liquid tobacco extract is at least about 0.5, even more preferably at least about 1, most preferably at least about 1.5. In particularly preferred embodiments, a ratio by weight of (β-ionone+β- damascenone) to (phenol) in the liquid tobacco extract is at least about 2 and most preferably from about 2 to about 10 or from about 2 to about 5.

In preferred embodiments, in the liquid tobacco extract a ratio by weight of (furaneol+(2,3-diethyl-5-methylpyrazine) *100)) to (nicotine) is at least about $5 \times 10^{-4}$. More preferably, a ratio by weight of (furaneol+(2,3-diethyl-5-methylpyrazine)*100)) to (nicotine) in the liquid tobacco extract is at least about $8 \times 10^{-4}$. Even more preferably, a ratio by weight of (furaneol+(2,3-diethyl-5-methylpyrazine)*100)) to (nicotine) in the liquid tobacco extract is at least about $1 \times 10^{-3}$.

Preferably, a ratio by weight of (furaneol+(2,3-diethyl-5-methylpyrazine)*100)) to (nicotine) in the liquid tobacco extract is less than or equal to about $9 \times 10^{-3}$. More preferably, a ratio by weight of (furaneol+(2,3-diethyl-5-methylpyrazine)*100)) to (nicotine) in the liquid tobacco extract is less than or equal to about $5 \times 10^{-3}$.

In some preferred embodiments, a ratio by weight of (furaneol+(2,3-diethyl-5-methylpyrazine)*100)) to (nicotine) in the liquid tobacco extract is from about $8 \times 10^{-4}$ to about $9 \times 10^{-3}$ or from about $8 \times 10^{-4}$ to about $5 \times 10^{-3}$ or from about $1 \times 10^{-3}$ to about $9 \times 10^{-3}$ or from about $1 \times 10^{-3}$ to about $5 \times 10^{-3}$. Where the volatile compounds are collected by absorption in a liquid solvent, as described above, the step of forming the liquid tobacco extract preferably comprises drying the solution of the volatile compounds in the liquid solvent in order to concentrate the solution. This may be carried out, for example, in order to arrive at a desired concentration of nicotine, or flavour compounds. Drying may be carried out using any suitable means, including but not limited to desiccation, molecular sieves, freeze drying, phase separation, distillation, membrane permeation, controlled crystallisation of water and filtering, reverse hygroscopicity, ultracentrifugation, liquid chromatography, reverse osmosis or chemical drying.

In preferred embodiments, the solution of the volatile compounds in a liquid solvent is concentrated by desiccation.

In other words, the solution of the volatile compounds in a liquid solvent is heated to evaporate at least some of the water and obtain a concentrated tobacco extract. To this purpose, the solution of the volatile compounds in a liquid solvent may be heated to a temperature and for a time such that the water content in the tobacco extract is reduced by at least about 60 percent.

The partially desiccated, concentrated tobacco extract can be considered the primary product of a method in accordance with the present invention. Depleted tobacco material, from which the volatile species and most of the moisture content have been extracted upon heating during the second step, may be considered a by-product of the method. Such depleted tobacco material may typically have a moisture content of about 1 to 5 percent by weight, preferably about 2 to 3 percent by weight.

In an embodiment, the solution of the volatile compounds in a liquid solvent is heated under vacuum, preferably at a temperature of at least about 70 degrees Celsius. In another embodiment, the solution of the volatile compounds in a liquid solvent is heated under a flow of air, preferably under a flow of air having relatively low humidity, at a temperature of at least about 35 degrees Celsius. Thus, a naturally derived, concentrated tobacco extract can be obtained by a method in accordance with the invention. One such naturally derived, concentrated tobacco extract typically contains less than about 20 percent by weight of water.

Alternatively, where the volatile compounds are collected by condensation, the step of forming the liquid tobacco extract may comprise adding the condensate to a liquid solvent, such as an aerosol former.

Optionally, the step of forming the liquid tobacco extract comprises a filtering step.

Optionally, the step of forming the liquid tobacco extract comprises a blending step in which extracts derived from different tobacco starting materials are combined.

Optionally, the step of forming the liquid tobacco extract comprises adding one or more additives, such as an organic acid, to the solution of volatile compounds. However, in many cases the liquid tobacco extract is suitable for use without the inclusion of additives.

The present invention further provides a liquid tobacco extract produced by a method according to the first aspect of the invention, as described in detail above. As described above, the method of the present invention advantageously produces a natural liquid tobacco extract that has a highly desirable ratio of desired tobacco compounds, such as nicotine and flavour compounds, to undesirable tobacco compounds.

The liquid tobacco extract is particularly suitable for producing a nicotine composition, such as a liquid nicotine composition or a gel nicotine composition, for use in an aerosol-generating system. In such an aerosol-generating system, the nicotine composition is typically heated within an aerosol-generating device.

As used herein, the term "aerosol generating device" refers to a device comprising a heater element that interacts with a nicotine composition incorporating a liquid tobacco extract such as that obtained by a method in accordance with the invention to produce an aerosol. During use, volatile compounds are released from the nicotine composition by heat transfer and entrained in air drawn through the aerosol generating device. As the released compounds cool they condense to form an aerosol that is inhaled by the consumer.

Upon heating of a nicotine composition comprising the liquid tobacco extract according to the present invention, an aerosol is released containing the volatile compounds that have been collected from the tobacco starting material during the extraction process. By controlling the composition of the liquid tobacco extract through control of the parameters of the extraction parameter, it is possible to adjust the composition and characteristics of the resultant aerosol produced from the liquid tobacco extract and delivered to the consumer.

The nicotine composition may be a liquid tobacco extract resulting from an extraction process in accordance with the present invention, without the addition of further nicotine. The nicotine composition may be a liquid tobacco extract resulting from an extraction process in accordance with the present invention, without the addition of further flavour compounds. The nicotine composition may be a liquid tobacco extract resulting from an extraction process in accordance with the present invention, without the addition of further furaneol. The nicotine composition may be a liquid tobacco extract resulting from an extraction process in accordance with the present invention, without the addition of further solvent.

Alternatively, the liquid tobacco extract may be subjected to additional processing steps to form the nicotine composition. Even when subjected to such additional steps, the nicotine composition may be formed without the need for addition of further nicotine or flavour compounds.

Preferably, the liquid tobacco extract may be concentrated in a desiccation step as described above to form a concentrated tobacco extract, and the concentrated tobacco extract may be used to form the nicotine composition.

Preferably, the concentrated tobacco extract comprises between 8 percent and 15 percent by weight water based on the weight of the concentrated tobacco extract.

The desiccation step provides a concentrated tobacco extract that may have a non-aqueous extraction solvent content of from about 65 percent to about 95 percent by weight, preferably from about 65 percent to 85 percent by weight, most preferably from about 75 percent to about 85 percent by weight. The non-aqueous extraction solvent is preferably triacetin, glycerin, propylene glycol, 1,3-propanediol or a mixture thereof.

The desiccation step provides a concentrated tobacco extract that may have a nicotine content of at least about 0.2 percent by weight nicotine, preferably from about 0.5 percent by weight to about 12 percent by weight nicotine, most preferably from about 2 percent by weight to about 8 percent by weight nicotine.

Preferably, additional non-aqueous solvent may be added to the liquid tobacco extract or the concentrated tobacco extract to form the nicotine composition.

The nicotine composition may be a liquid nicotine composition or a gel nicotine composition.

The nicotine composition may comprise at least about 10 percent by weight of a liquid tobacco extract. Preferably, the nicotine composition comprises at least about 20 percent by weight of a liquid tobacco extract. More preferably, the nicotine composition comprises at least about 30 percent by weight of a liquid tobacco extract. In preferred embodiments, the nicotine composition comprises at least about 40 percent by weight of a liquid tobacco extract, more preferably at least about 50 percent by weight of a liquid tobacco extract, even more preferably at least about 60 percent by weight of a liquid tobacco extract. In particularly preferred embodiments, the nicotine composition comprises at least about 65 percent by weight of a liquid tobacco extract, more preferably at least about 70 percent by weight of a liquid tobacco extract, even more preferably at least about 75 percent by weight of a liquid tobacco extract, most preferably at least about 80 percent by weight of a liquid tobacco extract.

In some embodiments, the liquid tobacco extract is concentrated tobacco extract. The nicotine composition may comprise at least about 10 percent by weight of concentrated tobacco extract, at least about 20 percent by weight of concentrated tobacco extract, at least about 30 percent by weight of concentrated tobacco extract, at least about 40 percent by weight of concentrated tobacco extract, at least about 50 percent by weight of concentrated tobacco extract, preferably at least about 60 percent by weight of concentrated tobacco extract, more preferably at least about 70 percent by weight of concentrated tobacco extract, even more preferably at least about 75 percent by weight of concentrated tobacco extract, and most preferably at least about 80 percent by weight of concentrated tobacco extract.

In some embodiments, the nicotine composition comprises from about 40 percent by weight to about 95 percent by weight of a liquid tobacco extract. More preferably, the nicotine composition comprises from about 40 percent by weight to about 95 percent by weight of a liquid tobacco extract. Even more preferably, the nicotine composition comprises from about 50 percent by weight to about 95 percent by weight of a liquid tobacco extract. Most preferably, the nicotine composition comprises from about 60 percent by weight to about 95 percent by weight of a liquid tobacco extract. In some particularly preferred embodiments, the nicotine composition comprises from about 70 percent by weight to about 95 percent by weight of a liquid tobacco extract, even more preferably from about 80 percent by weight to about 95 percent by weight of a liquid tobacco extract.

In some embodiments, the nicotine composition comprises from about 40 percent by weight to about 90 percent by weight of a liquid tobacco extract. More preferably, the nicotine composition comprises from about 40 percent by weight to about 90 percent by weight of a liquid tobacco extract. Even more preferably, the nicotine composition comprises from about 50 percent by weight to about 90 percent by weight of a liquid tobacco extract. Most preferably, the nicotine composition comprises from about 60 percent by weight to about 90 percent by weight of a liquid tobacco extract. In some particularly preferred embodiments, the nicotine composition comprises from about 70 percent by weight to about 90 percent by weight of a liquid tobacco extract, even more preferably from about 80 percent by weight to about 90 percent by weight of a liquid tobacco extract.

In some embodiments, the nicotine composition comprises from about 40 percent by weight to about 85 percent by weight of a liquid tobacco extract. More preferably, the nicotine composition comprises from about 40 percent by weight to about 85 percent by weight of a liquid tobacco extract. Even more preferably, the nicotine composition comprises from about 85 percent by weight to about 90 percent by weight of a liquid tobacco extract. Most preferably, the nicotine composition comprises from about 60 percent by weight to about 85 percent by weight of a liquid tobacco extract. In some particularly preferred embodiments, the nicotine composition comprises from about 70 percent by weight to about 85 percent by weight of a liquid tobacco extract, even more preferably from about 80 percent by weight to about 85 percent by weight of a liquid tobacco extract.

The nicotine composition may comprise up to about 100 percent by weight of a liquid tobacco extract. In some embodiments, the nicotine composition may be formed directly from the liquid tobacco extract without the need for addition of additional non-aqueous solvent, flavourants or nicotine. That is to say, the nicotine composition may comprise 100 percent by weight of a liquid tobacco extract. In some embodiments, the liquid tobacco extract is concentrated tobacco extract, such that the nicotine composition may comprise 100 percent by weight of concentrated tobacco extract. In embodiments in which the nicotine composition comprises 100 percent by weight of a liquid tobacco extract or 100 percent by weight of concentrated tobacco extract, additional non-aqueous solvent is not present.

Alternatively, in some embodiments, the nicotine composition comprising liquid tobacco extract may comprise additional non-aqueous solvent. Additional non-aqueous solvent is non-aqueous solvent that has been added after the extraction step. Additional non-aqueous solvent is solvent that is supplemental to the non-aqueous extraction solvent present in the liquid tobacco extract. In embodiments in which the liquid tobacco extract is concentrated tobacco extract, the nicotine composition comprising concentrated tobacco extract may comprise additional non-aqueous solvent.

The additional non-aqueous solvent may be an aerosol former. Preferably, the additional non-aqueous solvent is triacetin, glycerin, propylene glycol, 1,3-propanediol or a mixture thereof.

In embodiments in which the nicotine composition comprises additional non-aqueous solvent, the nicotine composition may comprise 90 percent by weight or less of the additional non-aqueous solvent. Preferably, the nicotine composition comprises 80 percent by weight or less of the additional non-aqueous solvent. More preferably, the nicotine composition comprises 70 percent by weight or less of the additional non-aqueous solvent. In preferred embodiments, the nicotine composition comprises about 60 percent by weight or less of the additional non-aqueous solvent, more preferably about 50 percent by weight or less of the additional non-aqueous solvent, even more preferably about 40 percent by weight or less of the additional non-aqueous solvent. In particularly preferred embodiments, the nicotine composition comprises about 35 percent by weight or less of the additional non-aqueous solvent, more preferably about 30 percent by weight or less of the additional non-aqueous solvent, even more preferably about 25 percent by weight or less of the additional non-aqueous solvent, most preferably about 20 percent by weight or less of the liquid tobacco extract.

In a nicotine composition prepared by means of a method in accordance with the present invention at least 50 percent by weight based on the total weight of the nicotine composition of the nicotine content in the nicotine composition may come from the tobacco extract as opposed to being added following extraction. In preferred embodiments, at least 80 percent by weight based on the total weight of the nicotine composition of the nicotine content in the nicotine composition comes from the tobacco extract as opposed to being added following extraction. Even more preferably, at least 90 percent by weight based on the total weight of the nicotine composition of the nicotine content in the nicotine composition comes from the tobacco extract as opposed to being added following extraction.

In a nicotine composition prepared by means of a method in accordance with the present invention at least 50 percent by weight based on the total weight of the nicotine composition of the non-aqueous extraction solvent content in the nicotine composition may come from the tobacco extract as opposed to being added following extraction. In preferred embodiments, at least 80 percent by weight based on the total weight of the nicotine composition of the non-aqueous extraction solvent content in the nicotine composition comes from the tobacco extract as opposed to being added following extraction. Even more preferably, at least 90 percent by weight based on the total weight of the nicotine composition of the non-aqueous extraction solvent content in the nicotine composition comes from the tobacco extract as opposed to being added following extraction.

In a nicotine composition prepared by means of a method in accordance with the present invention at least 50 percent by weight based on the total weight of the nicotine composition of the water content in the nicotine composition may come from the tobacco extract as opposed to being added following extraction. In preferred embodiments, at least 80 percent by weight based on the total weight of the nicotine composition of the water content in the nicotine composition comes from the tobacco extract as opposed to being added following extraction. Even more preferably, at least 90 percent by weight based on the total weight of the nicotine composition of the water content in the nicotine composition comes from the tobacco extract as opposed to being added following extraction.

In a nicotine composition prepared by means of a method in accordance with the present invention at least 50 percent by weight based on the total weight of the nicotine composition of the desirable tobacco flavour species content in the nicotine composition may come from the tobacco extract as opposed to being added following extraction. In preferred embodiments, at least 80 percent by weight based on the total weight of the nicotine composition of the desirable tobacco flavour species content in the nicotine composition comes from the tobacco extract as opposed to being added following extraction. Even more preferably, at least 90 percent by weight based on the total weight of the nicotine composition of the desirable tobacco flavour species content in the nicotine composition comes from the tobacco extract as opposed to being added following extraction.

By way of example, in a nicotine composition prepared by means of a method in accordance with the present invention at least 50 percent by weight based on the total weight of the nicotine composition of furaneol content in the nicotine composition may come from the tobacco extract as opposed to being added following extraction. In preferred embodiments, at least 80 percent by weight based on the total weight of the nicotine composition of furaneol content in the nicotine composition comes from the tobacco extract as opposed to being added following extraction. Even more preferably, at least 90 percent by weight based on the total weight of the nicotine composition of the furaneol content in the nicotine composition comes from the tobacco extract as opposed to being added following extraction.

As another example, in a nicotine composition prepared by means of a method in accordance with the present invention at least 50 percent by weight based on the total weight of the nicotine composition of 2,3-diethyl-5-methylpyrazine content in the nicotine composition may come from the tobacco extract as opposed to being added following extraction. In preferred embodiments, at least 80 percent by weight based on the total weight of the nicotine composition of 2,3-diethyl-5-methylpyrazine content in the nicotine composition comes from the tobacco extract as opposed to being added following extraction. Even more preferably, at least 90 percent by weight based on the total weight of the nicotine composition of the 2,3-diethyl-5-methylpyrazine content in the nicotine composition comes from the tobacco extract as opposed to being added following extraction.

The total content of non-aqueous solvent in the nicotine composition includes the non-aqueous extraction solvent and the additional non-aqueous solvent, if it is present. The nicotine composition may comprise a total content of non-aqueous solvent of from about 10 percent to about 95 percent by weight. The nicotine composition preferably comprises a total content of non-aqueous solvent of from about 50 percent to about 95 percent by weight, for example from about 65 percent to about 95 percent by weight, more preferably from about 70 to about 90 percent by weight, most preferably from about 80 percent to about 90 percent by weight. The non-aqueous solvent is preferably triacetin, glycerine, propylene glycol, 1,3-propanediol or a mixture thereof.

The nicotine composition may comprise a total content of propylene glycol of from about 10 percent to about 95 percent by weight. The nicotine composition may comprise a total content of propylene glycol of from about 20 percent to about 95 percent by weight, such as from about 50 percent to about 95 percent by weight, or from about 65 percent to about 95 percent by weight, from about 70 to about 90 percent by weight, or from about 80 percent to about 90 percent by weight.

The nicotine composition may comprise a total content of triacetin of from about 10 percent to about 95 percent by weight. The nicotine composition may comprise a total content of triacetin of from about 20 percent to about 95 percent by weight, such as from about 50 percent to about 95 percent by weight, from about 70 to about 90 percent by weight or from about 65 percent to about 95 percent by weight, or from about 80 percent to about 90 percent by weight.

The nicotine composition may comprise a total content of glycerine of from about 10 percent to about 95 percent by weight. The nicotine composition may comprise a total content of glycerine of from about 20 percent to about 95 percent by weight, such as from about 50 percent to about 95 percent by weight, or from about 65 percent to about 95 percent by weight, from about 70 to about 90 percent by weight or from about 80 percent to about 90 percent by weight.

The nicotine composition may comprise a total content of 1,3-propanediol of from about 10 percent to about 95 percent by weight. The nicotine composition may comprise a total content of 1,3-propanediol of from about 20 percent to about 95 percent by weight, such as from about 50 percent to about 95 percent by weight, or from about 65 percent to about 95 percent by weight, or from about 80 percent to about 90 percent by weight.

The nicotine composition of the present invention comprises at least 0.2 percent by weight of nicotine. More preferably, the nicotine content in the nicotine composition liquid tobacco extract is at least about 0.4 percent by weight. The nicotine composition may have a nicotine content of about 12 percent by weight or less, for example about 10 percent by weight or less, preferably about 8 percent by weight by weight or less, more preferably about 5 percent by weight or less, preferably about 3.6 percent by weight or less. Most preferably, the nicotine composition comprises between about 0.4 percent by weight and 3.6 percent by weight nicotine, based on the weight of the nicotine composition.

The nicotine composition may comprise between 1 percent and 85 percent by weight of water. The nicotine composition may comprise between 2 percent and 50 percent by weight of water. The nicotine composition may comprise between 3 percent and 30 percent by weight of water. The nicotine composition may comprise between 5 percent and 25 percent by weight of water. The nicotine composition may comprise between 8 percent and 20 percent by weight of water. The nicotine composition preferably comprises between 10 percent and 15 percent by weight water.

In some embodiments, the nicotine composition may comprise one or more water-soluble organic acids. As used herein with reference to the invention, the term "water-soluble organic acid" describes an organic acid having a water solubility at 20° C. of greater than or equal to about 500 mg/ml.

The one or more water-soluble organic acids may advantageously bind nicotine in the liquid tobacco extract through formation of one or nicotine salts. The one or more nicotine salts may advantageously be dissolved and stabilised in the water present in the liquid tobacco extract or in the non-aqueous solvent. This may advantageously reduce nicotine adsorption in the upper airways and enhance pulmonary nicotine delivery and retention as discussed above.

Preferably, the nicotine composition has a water-soluble organic acid content of greater than or equal to about 2 percent by weight. More preferably, the nicotine composition has a water-soluble organic acid content of greater than or equal to about 3 percent by weight.

The water-soluble organic acid may be acetic acid.

Exogenous acetic acid is acetic acid that has been added from a source other than the tobacco plant material, and is not acetic acid that is naturally present in the tobacco plant that has been separated from, removed from or derived from the tobacco plant material using the extraction processing conditions and techniques.

If acetic acid is added to the liquid tobacco extract to form the nicotine composition, then the total content of acetic acid in the nicotine composition, including both exogenous and endogenous acetic acid, is preferably from about 0.01 percent to about 8 percent by weight, for example between about 0.03 percent to about 8 percent by weight, from about 0.3 percent to about 8 percent by weight, from about 2 percent to about 8 percent by weight, or from about 3 percent to about 8 percent by weight. More preferably, the total acetic acid content is from about 0.01 percent to about 6 percent by weight, for example between about 0.03 percent to about 6 percent by weight, from about 0.3 percent to about 6 percent by weight, from about from about 2 percent to about 6 percent by weight, or from about 3 percent to about 6 percent by weight. Preferably, the nicotine composition has a water-soluble organic acid content of less than or equal to about 8 percent by weight. More preferably, the nicotine composition has a water-soluble organic acid content of less than or equal to about 6 percent by weight.

Preferably, the nicotine composition has a water-soluble organic acid content of between about 2 percent by weight and about 8 percent by weight. For example, the nicotine composition may have a water-soluble organic acid content of between about 2 percent by weight and about 6 percent by weight.

More preferably, the nicotine composition has a water-soluble organic acid content of between about 3 percent by weight and about 8 percent by weight. For example, the nicotine composition may have a water-soluble organic acid content of between about 3 percent by weight and about 6 percent by weight.

The nicotine composition may comprise one or more non-tobacco-derived flavourants. Suitable non-tobacco-derived flavourants include, but are not limited to, menthol.

Preferably, the nicotine composition has a non-tobacco-derived flavourant content of less than or equal to about 4 percent by weight. More preferably, the nicotine composition has a non-tobacco-derived flavourant content of less than or equal to about 3 percent by weight. For example, the liquid tobacco extract produced by the method of the present invention may be used to make a nicotine composition comprising between 10 and 20 mg of nicotine per millilitre, without the need for addition of nicotine.

A nicotine composition suitable for use in an aerosol-generating system may comprise the liquid tobacco extract produced in a method according to the present invention in combination with water and additional aerosol former. The nicotine composition may comprise, for example, between about 10 percent by weight and about 20 percent by weight of water.

A nicotine composition comprising the liquid tobacco extract according to the present invention may be provided in a cartridge for use in an aerosol-generating system. The cartridge may comprise an atomiser, configured to generate an aerosol from the nicotine composition. The atomiser may be a thermal atomiser, which is configured to heat the nicotine composition to generate an aerosol. The thermal atomiser may comprise, for example, a heater and a liquid transport element configured to transport the nicotine composition to the heater. The liquid transport element may comprise a capillary wick. Alternatively, the atomiser may be a non-thermal atomiser, which is configured to generate an aerosol from the nicotine composition by means other than heating. The non-thermal atomiser may be, for example, an impinging jet atomiser, an ultrasonic atomiser or a vibrating mesh atomiser.

The cartridge containing the nicotine composition formed from the liquid tobacco extract of the present invention may be used in conjunction with any suitable aerosol-generating device comprising a housing configured to receive at least a portion of the cartridge. The aerosol-generating device may comprise a battery and control electronics.

An embodiment of the present invention will now be further described, by way of example only.

EXAMPLE 1

A tobacco starting material is prepared from a flue-cured Bright tobacco material. The tobacco material is cut to form tobacco shreds having dimensions of 2.5 millimetres by 2.5 millimetres and the tobacco shreds are loaded into an extraction chamber, without compression. The tobacco starting material is heated within the extraction chamber to a temperature of 130 degrees Celsius for a period of 3 hours.

During heating, a flow of nitrogen is passed through the extraction chamber at a flow rate of about 40 litres per minute.

The volatile compounds released from the tobacco starting material during the heating step are collected by absorption into a liquid solvent formed of propylene glycol at minus 10 degrees Celsius and with agitation of 750 rpm.

The nicotine composition of Example 1 is a liquid tobacco extract obtained directly from an extraction process at a temperature of 130 degrees Celsius for a period of 3 hours. The nicotine composition provides an optimised level of desirable flavour compounds such as β-damascenone and β-ionone to undesirable compounds such as phenol, 4-(methylnitrosamino)-1-(3-pyridyl)-1-butanone, (R,S)—N-nitrosoanatabine, (R,S)—N-nitrosoanabasine, N-nitrosonornicotine and 2-furanemethanol. The nicotine composition further provides a level of desirable flavour compounds such as furaneol and 2,3-diethyl-5-methylpyrazine to nicotine. The solution of propylene glycol with the collected volatile compounds is concentrated in a desiccation process to reduce the moisture level of the liquid tobacco extract to approximately 15 percent.

EXAMPLE 2

This example provides two nicotine compositions in accordance with the invention, both of which are liquid tobacco extracts obtained directly from an extraction process at a temperature of 130 degrees Celsius for a period of 3 hours.

EXAMPLE 2a

Example 2a relates to a liquid tobacco extract derived from flue-cured Bright tobacco material. The content of the concentrated liquid tobacco extract of Example 2a is as follows:
Nicotine: 0.53% w/w
Propylene Glycol: 91.8% w/w
Water: 6.3% w/w
Balance (including flavourants as detailed in Table 1 below): 1.57% w/w

EXAMPLE 2b

Example 2b relates to a liquid tobacco extract derived from Burley tobacco material. The content of the concentrated liquid tobacco extract of Example 2b is as follows:
Nicotine: 1.82% w/w
Propylene Glycol: 89.6% w/w
Water: 5.7% w/w
Balance (including flavourants as detailed in Table 1 below): 2.88% w/w

TABLE 1

Content of selected flavour compounds in liquid tobacco extract (all values given in micrograms per kilogram of liquid tobacco extract)

| Example | Acetic acid | β-ionone | β-damascenone | furaneol | 2,3-diethyl-5-methyl-pyrazine | Vanillin | 2-ethyl-3,5-dimethyl-pyrazine | 2-methyl-butanoic acid | 3-methyl-butanoic acid | 3-methyl-2,4-nonane-dione | 2-meth-oxy-phenol | 2-phenyl-ethanol | Eugenol | sotolone |
|---|---|---|---|---|---|---|---|---|---|---|---|---|---|---|
| 2a | 6193580 | 1352 | 2995 | 2420 | 39 | 1040 | 838 | 14081 | 20114 | 273 | 1649 | 19875 | 619 | 85 |
| 2b | 3868247 | 939 | 1139 | 154 | 478 | 340 | 1980 | 16209 | 36356 | 69 | 3169 | 18196 | 845 | 36 |

The nicotine compositions of Examples 2a and 2b in accordance with the invention contain acceptably low levels of undesirable compounds such as phenol, 4-(methylnitrosamino)-1-(3-pyridyl)-1-butanone, (R,S)—N-nitrosoanatabine, (R,S)—N-nitrosoanabasine, N-nitrosonornicotine and 2-furanemethanol.

EXAMPLE 3

This example provides three nicotine compositions in accordance with the invention, each of which is a liquid tobacco extract obtained directly from an extraction process at a temperature of 130 degrees Celsius for a period of 3 hours.

EXAMPLE 3a

Example 3a relates to a liquid tobacco extract derived from oriental Bright tobacco material. The content of the liquid tobacco extract of Example 3a is as follows:
Nicotine: 0.4% w/w
Propylene glycol: 84% w/w
Acetic Acid: 1.0% w/w
Water: 12.5% w/w
Balance (including flavourants): 2.1% w/w

EXAMPLE 3b

Example 3b relates to a liquid tobacco extract derived from flue-cured Bright tobacco material. The content of the liquid tobacco extract of Example 3b is as follows:

Nicotine: 1.2% w/w
Propylene Glycol: 84% w/w
Acetic acid: 1.0% w/w
Water: 12.5% w/w
Balance (including flavourants): 1.3% w/w EXAMPLE 3c Example 3c relates to a liquid tobacco extract derived from Burley tobacco material. The content of the liquid tobacco extract of Example 3c is as follows:
Nicotine: 2.6% w/w
Propylene Glycol: 84% w/w
Acetic acid: 0.5% w/w
Water: 12.5% w/w
Balance (including flavourants): 0.4% w/w The nicotine compositions of Example 3 provide an optimised level of desirable flavour compounds such as β-damascenone and β-ionone to undesirable compounds such as phenol, 4-(methylnitrosamino)-1-(3-pyridyl)-1-butanone, (R,S)—N-nitrosoanatabine, (R,S)—N-nitrosoanabasine, N-nitrosonornicotine and 2-furanemethanol. The nicotine compositions further provide a level of desirable flavour compounds such as furaneol and 2,3-diethyl-5-methylpyrazine to nicotine.

EXAMPLE 4

The liquid tobacco extract of Example 1 was concentrated in a desiccation process to reduce the moisture level of the liquid tobacco extract to approximately 15 percent.

Glycerine was added to the resultant concentrated liquid tobacco extract to form the nicotine composition, such that the nicotine composition contained 20 percent by weight glycerine and 80 percent by weight liquid tobacco extract, based on the weight of the nicotine composition.

EXAMPLE 5

Example 4 relates to a nicotine composition in the form of a gel in accordance with the invention. The gel nicotine composition is formed from the liquid tobacco extract of Example 1.
The content of the gel nicotine composition is as follows:
Liquid tobacco extract of Example 1: 99.0% w/w
Agar: 1.0% w/w

EXAMPLE 6

Three tobacco starting materials are prepared from a flue-cured Bright tobacco material (6A), a Burley tobacco material (6B), and an Oriental tobacco material (6C), respectively.

Each one of the three tobacco materials is cut to form tobacco shreds having dimensions of 2.5 millimetres by 2.5 millimetres, and the tobacco shreds are loaded into an extraction chamber, without compression.

Each one of the tobacco starting materials is heated within the extraction chamber to a temperature of 130 degrees Celsius for a period of 120 minutes. During heating, a flow of nitrogen is passed through the extraction chamber at a flow rate of 2 litres per minute.

The volatile compounds released from each tobacco starting material during the heating step are collected by absorption into a liquid solvent formed of polypropylene glycol at 0 degrees Celsius.

A liquid tobacco extract is obtained directly from such extraction process. Each liquid extract obtained from each one of the three tobacco starting materials is then concentrated under vacuum (50 mbar) at 55 degrees Celsius until a moisture content of 12 percent±2 percent is reached.

TABLE 2

Value of selected ratios by weight of desirable to undesirable tobacco compounds within the liquid tobacco extracts

| Example | (β-ionone + β-damascenone) to (phenol) | (furaneol + (2,3-diethyl-5-methylpyrazine)*100)) to (nicotine) | (β-ionone + β-damascenone) to (4-(methylnitrosamino)-1-(3-pyridyl)-1-butanone + (R,S)-N-nitrosoanatabine + (R,S)-N-nitrosoanabasine + N-nitrosonornicotine + ((2-furanemethanol)/600)) |
|---|---|---|---|
| 6A | 2.27 | $1.35 \times 10^{-3}$ | 5.25 |
| 6B | 2.96 | $1.71 \times 10^{-3}$ | 3.50 |
| 6C | 4.12 | $2.75 \times 10^{-3}$ | 7.83 |

In all three liquid extracts in accordance with the invention 6A, 6B, and 6C the ratio by weight of (β-ionone+β-damascenone) to (phenol) is consistently and significantly above 2.0. Further, in all three liquid extracts in accordance with the invention 6A, 6B, and 6C the ratio by weight of (furaneol+(2,3-diethyl-5-methylpyrazine)*100)) to (nicotine) is consistently and significantly above $1 \times 10^{-3}$. Additionally, in all three liquid extracts in accordance with the invention 6A, 6B, and 6C the ratio by weight of (β-ionone+β-damascenone) to (4-(methylnitrosamino)-1-(3-pyridyl)-1-butanone+(R,S)—N-nitrosoanatabine+(R,S)—N-nitrosoanabasine+N-nitrosonornicotine+((2-furanemethanol)/600)) is consistently and significantly above 3.

The invention claimed is:

1. A method of producing a liquid tobacco extract, the method comprising the steps of:
preparing a tobacco starting material comprising natural tobacco material, wherein in the step of preparing the tobacco starting material, the tobacco starting material is not subjected to an acid treatment or a base treatment;
heating the tobacco starting material in a non-sealed extraction chamber at an extraction temperature of between 125 degrees Celsius and 160 degrees Celsius for between 90 minutes and 270 minutes to release gaseous volatile compounds from the tobacco starting material, wherein the tobacco starting material is not in a liquid suspension during the heating step, wherein a flow of inert gas is passed through the tobacco starting material during the heating step in the non-sealed extraction chamber, and wherein the inert gas carries the gaseous volatile compounds released from the tobacco starting material during heating away from the non-sealed extraction chamber;
collecting the volatile compounds released and carried away from the tobacco starting material by the inert gas flow during the heating step; and
forming a liquid tobacco extract comprising the collected volatile compounds.

2. The method according to claim 1, wherein the tobacco starting material is heated at an extraction temperature of between 125 degrees Celsius and 140 degrees Celsius.

3. The method according to claim 2, wherein the tobacco starting material is heated at the extraction temperature for at least 120 minutes.

4. The method according to claim 2, wherein the extraction temperature is selected to provide a liquid tobacco extract having a nicotine content of at least 0.2 percent by weight based on dry weight.

5. The method according to claim 2, wherein the extraction temperature is selected to provide a ratio by weight of (β-ionone+β-damascenone) to (phenol) of at least about 0.25.

6. The method according to claim 2, wherein the extraction temperature is selected to provide a ratio by weight of (furaneol+(2,3-diethyl-5-methylpyrazine)*100)) to (nicotine) of at least about $5 \times 10^{-4}$.

7. The method according to claim 1, wherein the tobacco starting material is impregnated with an aerosol former before the heating step.

8. The method according to claim 1, wherein the volatile compounds are collected by condensation.

9. The method according to claim 1, wherein the volatile compounds are collected by absorption into a liquid solvent comprising an aerosol former.

10. The method according to claim 9, wherein the aerosol former comprises glycerin, propylene glycol, or a combination thereof.

11. The method according to claim 1, further comprising the step of drying or concentrating the collected volatile compounds.

12. The method according to claim 1, wherein the step of preparing the tobacco starting material comprises grinding the tobacco material to form a tobacco powder.

* * * * *